Patented Aug. 24, 1937

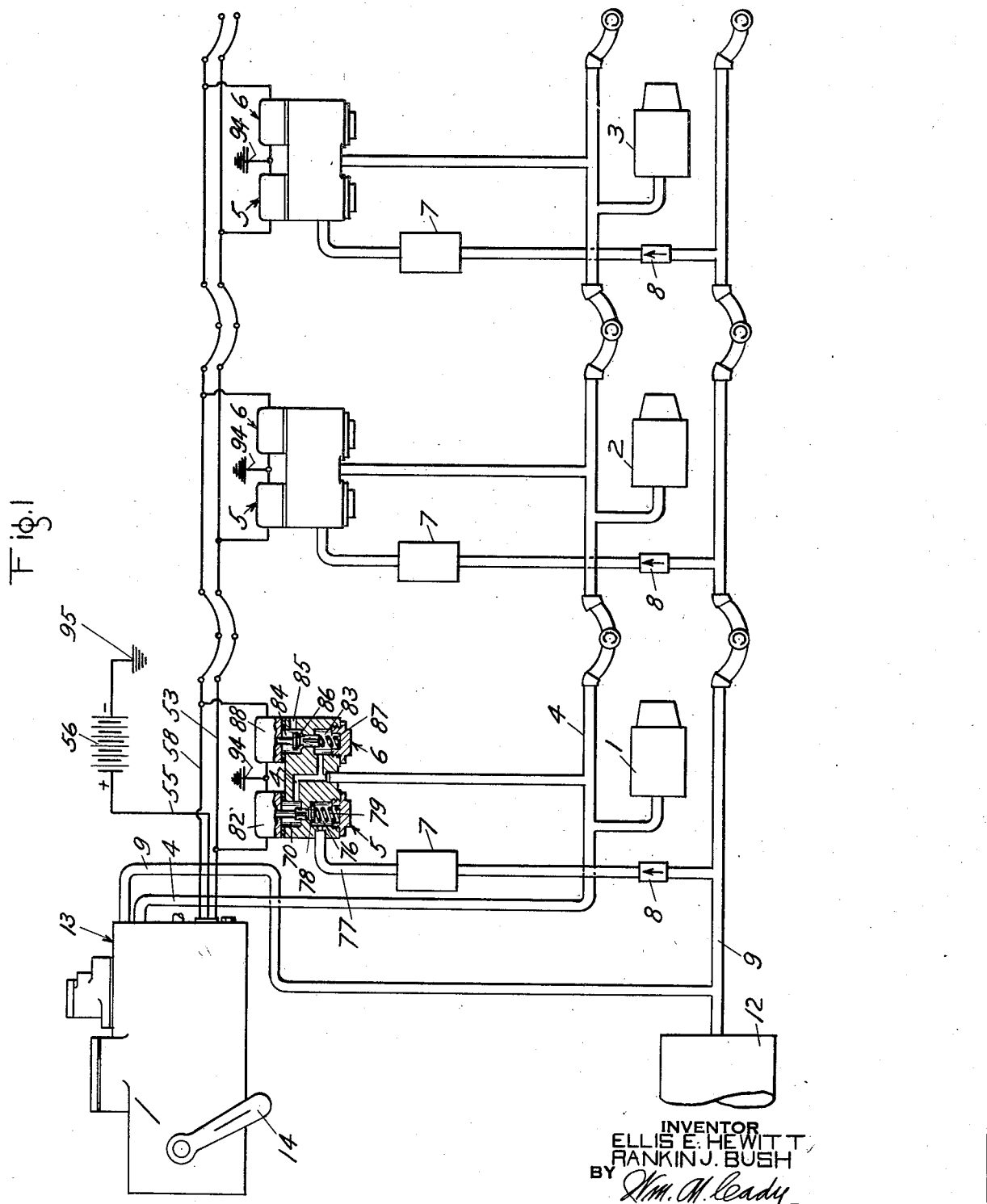

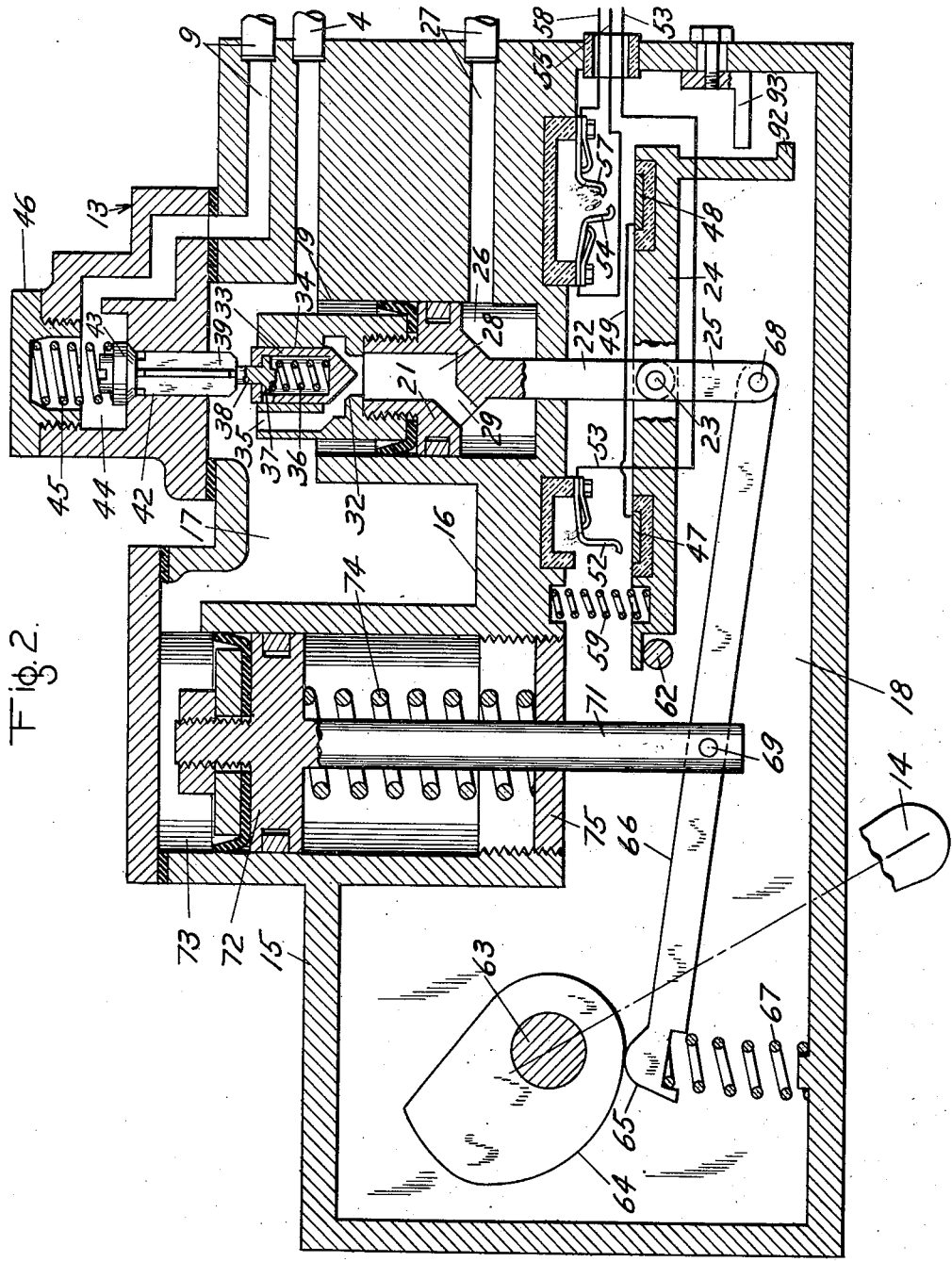

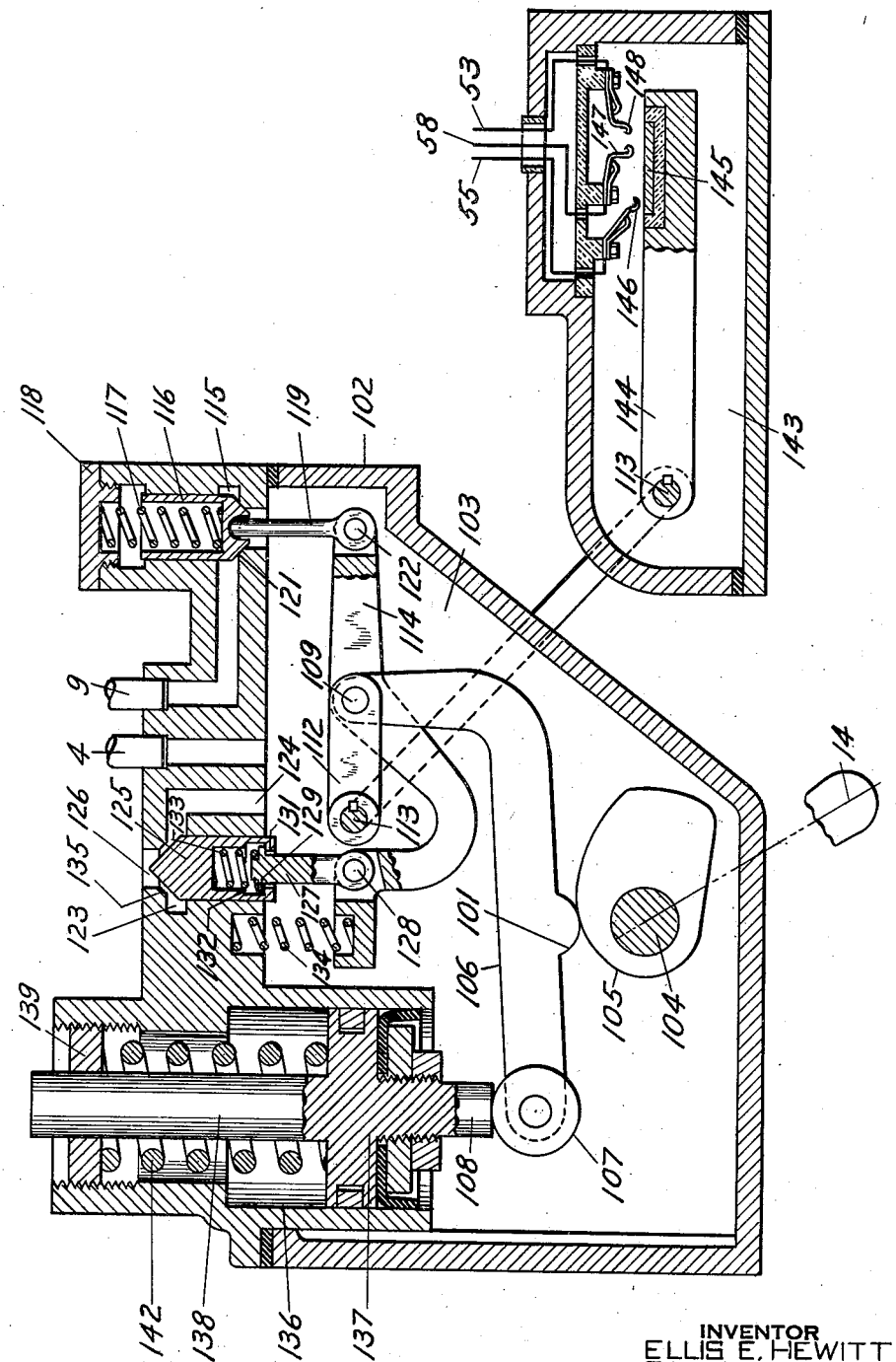

2,091,045

UNITED STATES PATENT OFFICE 2,091,045

BRAKE CONTROL APPARATUS

Ellis E. Hewitt, Edgewood, and Rankin J. Bush, Jeannette, Pa., assignors to The Westinghouse Air Brake Company, Wilmerding, Pa., a corporation of Pennsylvania Application January 16, 1936, Serial No. 59,396

13 Claims. (Cl. 303—20)

This invention relates to brake equipment and more particularly to brake equipment for high speed railway trains and traction vehicles.

Modern conditions require that railway trains and traction vehicles be operated at relatively high speeds. When such trains and vehicles are operated at high speeds, a braking equipment must be provided which combines a high degree of reliability with flexibility so that the train or vehicle can be handled with the utmost regard for safety. This invention relates to train braking systems adapted for use on high speed trains such, for example, as equipment of the general character disclosed and claimed in the copending application of Clyde C. Farmer for Electropneumatic brakes, Serial No. 712,153, filed June 21, 1934, and assigned to the same assignee as this application.

In the braking equipment disclosed in the copending application above referred to, a self-lapping brake valve device is provided for controlling the supply of fluid under pressure to the straight air pipe in accordance with the degree of movement of the handle of the brake valve device from its release position, and magnet valve devices are provided for also controlling the supply of fluid under pressure to and the release of fluid under pressure from the straight air pipe in accordance with the operation of the supply valve and the release valve of the brake valve device.

It is an object of our invention to provide a self-lapping brake valve device having supply and release valves therein for controlling the supply of fluid to, and the release of fluid under pressure from, a straight air pipe and provided with contact members controlled in accordance with the operation of said supply and release valves to control supply magnet valve devices and release magnet valve devices throughout the train for effecting a corresponding supply of fluid under pressure to, and release of fluid under pressure from, the straight air pipe, and in which said contact members are in a compartment not subject to straight air pipe pressure so as not to be affected by moisture or dirt that may be contained in the straight air pipe.

Other objects and advantages of our invention will be apparent from the following description of preferred embodiments of the invention, reference being had to the accompanying drawings.

Referring to the drawings,

Fig. 1 is a diagrammatic view of brake equipment organized in accordance with this invention, Fig. 2 is a sectional view through the brake valve device illustrated in Fig. 1, and Fig. 3 is a sectional view of a modified form of brake valve device.

Referring to Fig. 1 of the drawings, the brake equipment therein illustrated comprises a plurality of braking units identified by the brake cylinders 1, 2 and 3, respectively, that are supplied with fluid under pressure from the common straight air pipe 4 in accordance with the operation of an application magnet valve device 5 and a release magnet valve device 6 associated with each braking unit for controlling the supply of fluid under pressure to the straight air pipe 4 from the local supply reservoir 7 associated with each braking unit as supplied thereto through check valves 8 and a main reservoir pipe 9 from a main reservoir 12. The supply of fluid under pressure to the pipe 4 is controlled both by operation of the magnet valve devices 5 and 6 and by operation of valves contained within a brake valve device 13 in accordance with the movement of the brake valve handle 14.

Referring to Fig. 2 of the drawings, the brake valve device 13 comprises a casing 15 having a partition 16 therein dividing the brake valve device into two chambers 17 and 18. The lower portion of the brake valve device constitutes an electric self-lapping portion for controlling the normal service operation of the magnet valve devices 5 and 6, and the upper portion constitutes a pneumatic portion for controlling the supply of fluid under pressure to the straight air pipe 4 and from the straight air pipe to the atmosphere through the brake valve device itself without effecting the operation of the magnet valve devices.

A bore 19 is provided in the portion of the partition 16 for accommodating the movable abutment 21 having a stem 22 that extends through the partition 16 and is connected by means of a pin 23 to a contact carrying lever 24 and to a link 25. The space in the bore 19 below the movable abutment 21 provides an exhaust chamber 26 that is connected to the atmosphere through exhaust passage and pipe 27. A chamber 28 is provided within the movable abutment 21 and is in constant communication with the exhaust chamber 26 by a passage 29. A release valve seat 32 is provided on the abutment 21 at the upper end of the chamber 28 for accommodating a release valve 33 mounted within a bore 34 in the upper part of the movable abutment for controlling communication between the pressure chamber 17 and the atmosphere through passage 35 and chambers 28 and 26. A spring 36 is provided within a bore in the release valve 33, the lower end of which engages the end of the valve and the upper end of which engages a collar 37 carried by a stem 38 extending through the upper end of the valve and connected to a supply valve stem 39 that extends through a bore 42 in the upper wall of the chamber 17 from the supply valve 43 contained within a supply valve chamber 44 that is constantly connected by passage 9 to the main reservoir pipe 9. A spring 45 is provided in the chamber 44, the lower end of which engages the supply valve 43 and the upper end of which is positioned within a recess in a nut 46 attached within a bore in the upper part of the casing.

The contact carrying lever 24 in the chamber 18 below the partition 16 supports and carries movable contact members 47 and 48 that are electrically connected by a conductor 49. The movable contact member 47 is adapted to engage a fixed contact member 52 that is connected to the application train wire 53, and the movable contact member 48 is adapted to engage the fixed contact member 54 that is connected by conductor 55 to one terminal of a source of energy, such as the battery 56, and to also engage contact member 57 that is connected to the release train wire 58. The contact carrying lever 24 is urged downwardly by a spring 59, the lower end of which is inserted in a recess in the lever 24 and the upper end of which is inserted in a recess in the partition 16. The lever 24 is pressed downwardly by the spring 59 until the left end thereof engages a stop 62 and the contact members 47 and 48 are out of engagement with the contact members 52, 54 and 57, respectively, unless and until the contact carrying lever 24 is urged upwardly by operation of the brake valve handle 14 to a brake applying position in a manner to be presently described.

For operating the contact carrying lever 24 and the handle controlling the movement of the valves 33 and 43, a shaft 63 is provided that is movable by the brake valve handle 14 and upon which is carried a cam 64. The lower face of the cam 64 engages the rounded ends 65 of a floating lever 66 that is urged upwardly against the face of the cam by spring 67 that is positioned between the lower casing wall of the brake valve casing structure and the end 65 of the lever 66. The other end of the floating lever 66 is pivotally connected by a pin 68 to the link 25 that is operatively connected to the contact carrying lever 24 and the valve stem 22.

The floating lever 66 is pivoted at a point intermediate its ends on a pin 69 that is supported in a stem 71 that extends downwardly from a self-lapping piston 72 contained in a piston chamber 73 that is in open communication with the pressure chamber 17. A spring 74 positioned about the stem 71, having its upper end in engagement with the piston 72 and its lower end in engagement with a nut 75, urges the piston 72 upwardly to its illustrated position. The relative forces exerted by the springs 74 and 59 are such that when the left hand end 65 of the lever 66 is in its upper or illustrated position, the spring 59 exerts a sufficient downward force on the contact carrying lever 24 and the link 25 to effect separation of the movable contact members 47 and 48 from their associated stationary contact members.

The application magnet valve device 5 comprises a casing containing a chamber 70 that is in constant open communication with the straight air pipe 4, and an application valve chamber 76 that is in constant communication through pipe 77 with the supply reservoir 7, and which contains an application valve 78 that is normally urged to its seat by a spring 79 within the valve chamber 76 and is adapted to be forced downwardly from its seat against the bias of the spring 79 upon the deenergization of a magnet 82 provided in the upper part of the casing. The release magnet valve device 6 comprises a casing containing a chamber 83 that is in constant communication with the straight air pipe 4 and an exhaust chamber 84 that is in constant communication with the atmosphere through an exhaust port 85, and which contains a release valve 86 that is normally biased from its seat by a spring 87 contained within the chamber 83 and is adapted to be forced toward its seat upon the energization of a magnet 88 in the upper part of the casing.

During the initial charging of the system, the various parts of the apparatus remain in their release or illustrated positions and fluid under pressure flows from the main reservoir 12 through the main reservoir pipe 9 to charge the supply valve chamber 44 in the upper part of the brake valve device, and also from the main reservoir pipe 9 through the several check valve devices 8 associated with each braking unit to charge the supply reservoirs 7 thereof, and the application magnet valve chamber 76.

If the operator wishes to apply the brakes, the brake valve handle 14 is moved from its release position in a counterclockwise direction to a position depending upon the desired degree of application of the brakes. As the brake valve handle 14 is moved the cam 64 is also moved about its axis, thus forcing the end 65 of the floating lever 66 downwardly, causing the lever to pivot about the pin 69, thus forcing the right hand end of the lever and the connecting link 25 upwardly.

Upon upward movement of the connecting link 25 and of the pivot pin 23, the contact carrying lever 24 pivots about the stop 62, the left hand end of the lever being held in engagement with the stop 62 by the spring 59, until the right hand end has moved sufficiently to cause engagement of the contact member 48 with the contact members 54 and 57, and engagement of the downwardly extending arm 92 on the right hand end of the lever 24 with a stop member 93, mounted on the wall of the casing. Engagement of the contact member 48 with the contact members 54 and 57 closes a circuit from the positive terminal of the battery 56, through conductor 55, contact members 54, 48 and 57, conductor 58, through the windings of the several release magnets 88 in the several release magnet valve devices 6 to ground at 94, and to the grounded battery terminal 95. The completion of the above traced circuit causes the energization of the magnets 88 in each of the several release magnet valve devices 6, thus forcing the release valves 86 to their seats to close communication between the straight air pipe 4 and atmosphere.

Further upward movement of the link 25 and the pin 23, upon the further movement of the brake valve handle 14, causes the contact carrying lever 24 to pivot about the arm 92 that is in engagement with the stop 93, thus compressing the spring 59 and causing the contact member 47 to engage the contact member 52 to complete a circuit extending from the positive terminal of the battery 56 through conductor 55, contact members 54 and 48, conductor 49, contact members 47 and 52, conductor 53 and through the windings of the several magnets 82 in the application magnet valve devices 5, to ground at 94, and to the grounded terminal 95 of the battery 56. The completion of the above traced circuit effects the energization of the magnets 82 of the application magnet valve devices 5, thus forcing the application valve 78 downwardly from its seat to permit the flow of fluid under pressure from the supply reservoir 7 to the straight air pipe 4 to control brake cylinder pressure.

Upon the movement of the link 25 and of the pin 23 to cause engagement of the contact member 48 with the contact members 54 and 57, the movable abutment 21 is also moved by the stem 22 until the seat 32 is brought into engagement with the release valve 33 to close communication from the straight air pipe 4 through pressure chamber 17 to the atmosphere through exhaust chamber 26 and exhaust passage and pipe 27. Upon the further movement of the link 25 and the pin 23 upwardly to cause engagement of the contact member 47 with the contact member 52, the stem 22 and the movable abutment 21 are moved further upwardly, thus moving the release valve 33 against the stem 39 of the supply valve 43 with sufficient force to move it from its seat against the bias of the spring 45, to permit the flow of fluid under pressure from the main reservoir pipe 9 to the straight air pipe 4 through the supply valve chamber 44 and the pressure chamber 17.

It will be seen that the pressure chamber 17 and the piston chamber 73 are subject to straight air pipe pressure, and that, as the pressure within the piston chamber 73 increases, the downward force on the self-lapping piston 72 acts against the upward force of the spring 74 to move the piston 72 and its stem 71 downwardly, causing the floating lever 66 to fulcrum about its rounded end 65 to move the connecting link 25 and the pivot pin 23 downwardly. As the pivot pin 23 is moved downwardly the spring 59 causes the contact carrying lever 24 to fulcrum about the stop 93 at its right hand end, thus separating the contact members 47 and 52 prior to the separation of the contact member 48 from the contact members 54 and 57.

Upon separation of the contact member 47 from the contact member 52, the above traced circuit through the winding of the magnet 82 of each of the application magnet valve devices 5 is interrupted and the spring 79 urges the application magnet valve 78 to its seat, cutting off the further flow of fluid to the straight air pipe 4. The downward movement of the pin 23 sufficient to effect separation of the contact members 47 and 52, also releases the upward force on the supply valve stem 39, thus permitting the supply valve 43 to be seated by the spring 45 to close communication between the main reservoir pipe 9 and the straight air pipe 4 through the supply valve chamber 44.

The degree of pressure within the straight air pipe 4 and the self-lapping piston chamber 73 will depend upon the degree of movement of the brake valve handle 14 from its release position. If, after the valve mechanism is in lap position as above described, the brake valve handle is moved further from its release position, the cam 64 will again operate the lever 66 to close the circuit to the application magnet valve devices through contact members 47 and 52 and to at the same time force the supply valve 43 upwardly from its seat to cause a further increase in the fluid pressure supplied to the straight air pipe 4 and to the self-lapping chamber 73. Because the cam 64 has forced the left hand end 65 of the floating lever 66 further downwardly, a greater pressure in the piston chamber 73 is now required to force the piston 72 against the spring 74 sufficiently to cause the lever 66 to pivot about its left hand end 65 sufficiently to again separate the contact member 47 from the contact member 52 to again interrupt the circuit through the application magnet valve devices, and to likewise permit the supply valve 43 to be moved downwardly to its seat to close communication between the main reservoir pipe 9 and the straight air pipe 4 through the supply valve chamber 44.

In a similar manner, movement of the brake valve handle 14 from a position within its application zone to or toward its release position, effects a corresponding movement of the cam 64 and a raising of the fulcrum point established by engagement of the cam 64 with the rounded end 65 of the floating lever 66. This causes the lever 66 to pivot about the pin 69 to move its right hand end, together with the contact carrying lever 24, downwardly to effect separation of the contact member 48 from the contact members 54 and 57, and the deenergization of the magnets 88 of the release magnet valve devices 6, and movement of the release magnet valve 86 to its unseated position to effect the release of fluid under pressure from the straight air pipe 4 to the atmosphere. As the pivot 23 is moved downwardly, the stem 22 and the movable abutment 21 are also moved downwardly to effect separation of the release valve seat 32 from the release valve 33 to effect the release of fluid under pressure from the straight air pipe 4 to the atmosphere through the pressure chamber 17, passage 35, chamber 28, passage 29, chamber 26 and exhaust passage and pipe 27.

The brake valve device illustrated in Fig. 3 comprises a casing 102 containing a pressure chamber 103 that is in constant communication with the straight air pipe 4 and into which extends a shaft 104 actuated by the brake valve handle 14 and which carries a cam 105 that engages and actuates a floating lever 106, the left hand end of which is provided with a roller 107 that engages the end of a stem 108, and the right hand end of which is connected by means of a pivot pin 109 to a crank 112 carried by a shaft 113 and also to a floating lever 114.

The brake valve device also contains a supply valve chamber 115 that is in constant communication with the main reservoir pipe 9 and which contains a supply valve 116 mounted in a bore in the casing structure and having a central bore therein for accommodating a spring 117, the lower end of which engages the end of the supply valve 116 and the upper end of which is positioned within a recess in a cap nut 118. An operating rod 119 is provided, the upper end of which engages the supply valve 116 within a recess in its face, and the lower end of which is connected to the right hand end of the floating lever 114 by a pivot pin 122.

A release valve chamber 123 that is in constant communication through passage 124 with the pressure chamber 103, is also contained within the casing 102. A release valve 125 is contained within the release valve chamber 123 for controlling communication from the pressure chamber 103 to the atmosphere through the exhaust port 126. The release valve 125 is connected to the left hand end of the floating lever 114 by means of a stem 127 that is attached to the lever 114 by the pivot pin 128, which stem enters an opening in the lower end of the valve 125 and is provided with a collar 129 for engaging the inwardly extending flange 131 in the valve 125 or a shoulder 132 for actuating the valve from or to its seat 135. A spring 133 is provided in a cavity within the valve 125, the lower end of which engages the collar 129 carried by the stem 127 and the upper end of which engages the valve 125. A spring 134 is provided, the lower end of which is positioned in a recess in the left hand end of the lever 114 and the upper end of which is positioned in a recess in the upper wall of the brake valve casing structure. The relative forces of the springs 134 and 117 are such that, upon upward movement of the pivot pin 109, the supply valve 116 will be maintained seated by the spring 117 until after the release valve 125 has been forced against its seat 135.

A bore 136 is provided in the upper wall of the casing structure for accommodating a movable abutment 137 having the aforementioned downwardly extending stem 108 that forms the fulcrum point for the floating lever 106 and having an upwardly extending stem 138 that extends through a guide opening in a nut 139 closing the upper end of the bore. A spring 142 is provided about the stem 138, the lower end of which engages the movable abutment 137 and the upper end of which engages the nut 139.

The above mentioned shaft 113 extends from the pressure chamber 103 into a chamber 143 that is maintained at atmospheric pressure, and to which a lever 144 is mounted carrying a contact member 145 that is adapted to engage the contact member 146, that is connected to a source of energy through the battery supply conductor 55, the contact member 147 that is connected to the release magnet valve train conductor 58, and a contact member 148 that is connected to the application magnet valve device train conductor 53.

If the operator wishes to apply the brakes, the handle 14 is moved in a counterclockwise direction from its illustrated or release position an amount dependent upon the desired degree of application of the brakes. Such movement of the handle 14 causes the cam 105 to be similarly moved to engage a projection 101 on the floating lever 106, causing the lever to pivot about the lower end of the stem 108 as a fulcrum point, forcing the pivot pin 109 at the right hand end of the lever 106 upwardly, thus rotating the crank 112 and shaft 113 in a counterclockwise direction and also moving the floating lever 114 upwardly. The first portion of this upward movement of the floating lever 114 causes the lever to pivot about the pin 122, the left hand lever carrying the pivot pin 128 moving upwardly and forcing the valve 125 to its seat by means of the stem 127.

At the same time that the release valve 125 is brought to engagement with its seat 135, the counterclockwise rotation of the shaft 113 causes the lever 144 in the chamber 143 to be moved sufficiently to cause engagement of the contact member 145 carried thereby with the contact members 146 and 147, thus closing a circuit from the positive terminal of the source of energy through the battery supply conductor 55 and the release magnet valve train conductor 58 to energize the several release magnet valve devices 6, as shown in Fig. 2, and cause the release valves 86 thereof to be forced downwardly to their seats. Upon further upward movement of the pivot pin 109, the collar 129 carried on the stem 127 engages the shoulder 132 in the release valve 125, thus causing the pin 128 to become a pivot point about which the lever 114 rotates. Further upward movement of the pivot pin 109 therefore causes the pivot pin 122 and the operating rod 119 at the right hand end of the lever 114 to force the supply valve 116 from its seat 121 against the bias of the spring 117 and permit the flow of fluid under pressure from the main reservoir pipe 9 to the straight air pipe 4 through the pressure chamber 103.

As the pressure within the pressure chamber 103 builds up, the piston 137 which is subject on its lower side to pressure chamber pressure is forced upwardly against the bias of the spring 142 an amount depending upon the pressure within the chamber 103. The fulcrum point occasioned by the engagement of the stem 108 with the roller 107 is thus moved upwardly causing the floating lever 106 to fulcrum about the projection 101 to move the pivot pin 109 downwardly. As the pivot pin 109 moves downwardly, the floating lever 114 is fulcrumed about its left hand end, thus permitting the supply valve 116 to seat and close communication from the main reservoir pipe 9 to the pressure chamber 103 to cut off the further flow of fluid under pressure to the straight air pipe 4, and, at the same time, the shaft 113 is moved in a clockwise direction by the crank 112 sufficiently to cause the contact member 145 carried by the lever 144 to be separated from the contact member 146 and interrupt the above traced circuit through the application magnet valve train conductor 53, thus deenergizing the windings of the magnets 82 of the application magnet valve devices and permitting the application valves 78 to be forced to their seats by the springs 79, to thus close further communication from the supply reservoir 7 to the straight air pipe 4 through the application magnet valve devices.

The greater the degree of movement of the brake valve handle 14 from its release position, the greater will be the upward movement of the projection 101 of the lever 106 from its release position, thus the greater will be the pressure in the pressure chamber 103 necessary to force the piston 137 upwardly against the bias of the spring 142 sufficiently to cause movement of the pin 109 to a position to effect the seating of the supply valve 116 and the interruption of the circuit through the contact members 145 and 148.

If the operator now wishes to release the brakes, the handle 14 is moved to the release position, thus relieving the pressure of the cam 105 against the projection 101 and permitting the floating lever 106 to be moved downwardly, carrying with it the pivot pin 109, and rotating the shaft 113 slightly in a clockwise direction. This further movement of the pivot pin 109 causes the floating lever 114 to pivot about the right hand pivot pin 122, the spring 134 forcing the left hand of the lever 114 downwardly, and permitting the release valve 125 to be moved from engagement with its seat 135 to effect communication from the straight air pipe 4 and the pressure chamber 103 to the atmosphere through passages 124 and 126. At the same time, the shaft 113 is moved in a clockwise direction sufficiently that the lever 144 effects the separation of the contact member 145 from the contact members 146 and 147 to interrupt the above traced circuit through the battery supply conductor 55 and the release magnet valve train conductor 58 and effect deenergization of the windings of the magnets 88 of the several release magnet valve devices 6, thus permitting the springs 87 to force the release valves 86 upwardly from their seats and effect the release of fluid under pressure from the straight air pipe 4 to the atmosphere through exhaust passage 85.

It will be noted that the invention above described employs a self-lapping brake valve device for controlling both the pneumatic supply of air to the straight air pipe and the electrical supply of fluid under pressure to the straight air pipe, and that the contact members for controlling the magnet valve devices are contained in a chamber that is isolated from the pressure chamber. Should, for any reason, the electrical circuits or the battery fail, the brakes would remain under straight air pipe control through operation of the supply and release valves in the brake valve device without the necessity for the operator making any other than the usual movements of the brake valve handle to effect the desired result.

While we have illustrated and described certain preferred embodiments of our invention, it will be apparent to those skilled in the art that many modifications may be made within the spirit of our invention and we do not wish to be limited otherwise than by the scope of the appended claims.

Having now described our invention, what we claim as new and desire to secure by Letters Patent, is:

1. In a brake equipment for vehicles, in combination, a plurality of braking units each comprising a brake cylinder, a straight air pipe common to all braking units for controlling the degree of pressure in said brake cylinders, and means for controlling the pressure in said straight air pipe comprising magnet valve devices associated with each braking unit and a brake valve device having a chamber responsive to straight air pipe pressure and having valve means therein for controlling the supply of fluid through said brake valve device to said chamber, and a second chamber, circuit controlling means therein responsive to the movement of said brake valve device to a brake applying position or to a brake releasing position to correspondingly control the operation of said magnet valve devices, and means operative upon an increase in fluid pressure in said first chamber for causing an operation of said valve means and of said circuit controlling means to cut off the supply of fluid under pressure to said brake cylinders.

2. In a brake system, for vehicles, in combination, a brake cylinder, a straight air pipe for controlling the supply of fluid under pressure to said brake cylinder, magnet valve devices for controlling supply of fluid under pressure to and the release of fluid under pressure from said straight air pipe to control the application and release of the brakes, a brake valve device for controlling the operation of said magnet valve devices having a pressure chamber subject to straight air pipe pressure, and a second chamber, valve means for controlling the supply of fluid under pressure to and the release of fluid under pressure from said pressure chamber, contact means in said second chamber for controlling the magnet valve devices, and common actuating means for controlling the operation of said valve means and of said contact means.

3. In a brake system for vehicles, in combination, a brake cylinder, a straight air pipe for controlling the supply of fluid under pressure to said brake cylinder, magnet valve devices for controlling the supply of fluid under pressure to and the release of fluid under pressure from said straight air pipe to control the application and release of the brakes, a casing containing two chambers divided by a partition, one of said chambers being subject to straight air pipe pressure, valve means for controlling the supply of fluid under pressure to and the release of fluid under pressure from said chamber, the other of said chambers containing electrical control means for governing the operation of said magnet valve devices, and manually operable means extending through said partition to correspondingly control the operation of said valve means and of said electrical control means.

4. In a brake equipment for vehicles, in combination, a brake cylinder, a brake valve device having valve means for controlling the supply and release of fluid under pressure to and from the brake cylinder and containing two chambers separated by a partition, a stem extending through said partition and operatively connected to said valve means, electrically controlled means for also controlling the supply and release of fluid under pressure to and from the brake cylinder, contact members in said second chamber operatively connected to said stem to effect the simultaneous control of said valve means and of said electrically controlled means for effecting the supply of fluid under pressure to and the release of fluid under pressure from said brake cylinder.

5. In a brake equipment for vehicles, in combination, a brake cylinder, a brake valve device having valve means for controlling the supply and release of fluid under pressure to and from the brake cylinder and containing two chambers separated by a partition, a stem extending through said partition and operably connected to said valve means, electrically controlled means for also controlling the supply of fluid under pressure to and the release of fluid under pressure from the brake cylinder comprising contact members in said second chamber operatively connected to said stem to effect the simultaneous control of said valve means and of said electrically controlled means for controlling the supply of fluid under pressure to and the release of fluid under pressure from said brake cylinder, manually operable means for actuating said stem to effect an increasing application of the brakes, and means responsive to straight air pipe pressure for actuating said stem to interrupt the further increase in the application of the brakes.

6. In a brake equipment for vehicles, in combination, a plurality of braking units comprising a brake cylinder, a straight air pipe common to all braking units for controlling the degree of pressure in said brake cylinder, and means for controlling the pressure in said straight air pipe comprising magnet valve devices associated with each braking unit and a brake valve device having a first chamber responsive to straight air pipe pressure and having valve means for controlling the supply of fluid under pressure through said brake valve device to said chamber, a second chamber, circuit controlling means therein responsive to the movement of the brake valve device to a brake applying position and to a brake releasing position to correspondingly control the operation of said magnet valve devices, and means operative upon an increase in the fluid pressure in said first chamber for causing operation of said valve means and of said circuit controlling means to cut off the supply of fluid under pressure to said brake cylinder.

7. In a brake equipment for vehicles, in combination, a brake cylinder, straight air control means for supplying fluid under pressure to said brake cylinder comprising a straight air pipe, electroresponsive means for controlling the supply of fluid under pressure to said straight air pipe, a brake valve device having a handle, a self-lapping mechanism including a chamber in constant communication with said straight air pipe, valve means therein for supplying fluid under pressure to said chamber and straight air pipe upon movement of said brake valve handle to a brake applying position, and electrical control means outside of said chamber for controlling said electroresponsive means to effect the supply of fluid under pressure to said straight air pipe, common operating means for actuating said valve means and said electrical control means, and means operative upon an increase in the fluid pressure in said chamber for causing operation of said electroresponsive means and of said valve means to cut off the supply of fluid under pressure to said brake cylinder.

8. In a brake equipment for vehicles, in combination, a brake cylinder, a straight air pipe for controlling the supply of fluid under pressure to said brake cylinder to effect an application of the brakes, electroresponsive means for controlling the supply of fluid under pressure to said straight air pipe, and a brake valve device having valve means therein for controlling the supply of fluid under pressure to said straight air pipe, a pressure chamber subject to straight air pipe pressure, a chamber containing control mechanism for controlling said electroresponsive means, manually operable means for effecting simultaneous operation of said valve means and of said control mechanism to effect the supply of fluid under pressure to said straight air pipe, and means responsive to the pressure in said pressure chamber for effecting a simultaneous operation of said valve means and of said control mechanism to cut off the further supply of fluid under pressure to said straight air pipe.

9. In a brake equipment for vehicles, in combination, a plurality of braking units each comprising a brake cylinder, a straight air pipe for controlling the supply of fluid under pressure to said brake cylinder to effect an application of the brakes, electroresponsive means associated with each braking unit for controlling the supply of fluid under pressure to said straight air pipe, and a brake valve device having valve means therein for controlling the supply of fluid under pressure to said straight air pipe, a pressure chamber therein subject to straight air pipe pressure, a chamber therein containing control mechanism for controlling said electroresponsive means, manually operable means for effecting simultaneous operation of said valve means and of said control mechanism to effect the supply of fluid under pressure to said straight air pipe through said brake valve device and through said electroresponsive means, and means responsive to the pressure in said pressure chamber for effecting simultaneous operations of said valve means and of said control mechanism to cut off the further supply of fluid under pressure to said straight air pipe.

10. In a brake equipment for vehicles, in combination, a plurality of braking units each comprising a brake cylinder, a straight air pipe for controlling the supply of fluid under pressure to said brake cylinder to effect an application of the brakes, application and release magnet valve devices associated with each braking unit for controlling the supply of fluid under pressure to and the release of fluid under pressure from said straight air pipe, and a brake valve device having a pressure chamber subject to straight air pipe pressure and a chamber containing control mechanism for controlling said magnet valve devices, said chambers being separated by a partition, valve means for controlling the supply of fluid to said straight air pipe comprising a movable abutment in said pressure chamber having a stem extending through said partition wall between said chambers and provided with a release valve seat, a release valve adapted to engage said release valve seat and a supply valve adapted to be actuated from its seat to control the supply of fluid under pressure to said straight air pipe by movement of said abutment toward said release valve after the seating of said release valve, said stem being operatively connected to said control mechanism to effect operation of said release magnet valve device simultaneously with operation of the release valve of the brake valve device and to effect operation of said application magnet valve device simultaneously with operation of the supply valve of said brake valve device.

11. In a brake equipment for vehicles, in combination, a plurality of braking units each comprising a brake cylinder, a straight air pipe for controlling the supply of fluid under pressure to said brake cylinder to effect an application of the brakes, application and release magnet valve devices for controlling the supply of fluid under pressure to and the release of fluid under pressure from said straight air pipe, a brake valve device having a pressure chamber subject to straight air pipe pressure and a chamber containing control mechanism for controlling application and release magnet valve devices, a shaft extending between said chambers and operatively connected to said control mechanism, supply and release valves for controlling the supply of fluid under pressure to and the release of fluid under pressure from said pressure chamber, and means for actuating said shaft simultaneously with the operation of said supply and release valves to effect the simultaneous supply of fluid under pressure to said straight air pipe through said supply valve and said supply magnet valve devices and to effect the simultaneous release of fluid under pressure from said straight air pipe through said release valve and said release magnet valve devices.

12. In a brake equipment for vehicles, in combination, a plurality of braking units each comprising a brake cylinder, a straight air pipe for controlling the supply of fluid under pressure to said brake cylinder to effect an application of the brakes, application and release magnet valve devices associated with each braking unit for controlling the supply of fluid under pressure to and the release of fluid under pressure from said straight air pipe, and a brake valve device having a pressure chamber subject to straight air pipe pressure and a chamber containing control mechanism for controlling said magnet valve devices, said chambers being separated by a partition, valve means for controlling the supply of fluid under pressure to said straight air pipe comprising a movable abutment in said pressure chamber having a stem extending through said partition wall between said chambers and provided with a release valve seat, a release valve adapted to engage said release valve seat and a supply valve adapted to be actuated from its seat to control the supply of fluid under pressure to said straight air pipe by movement of said abutment toward said release valve after the seating of said release valve, said stem being operatively connected to said control mechanism to effect operation of said release magnet valve device simultaneously with operation of the release valve of the brake valve device and to effect operation of said application magnet valve device simultaneously with operation of the supply valve of said brake valve device, and means operative upon an increase in the fluid pressure in said pressure chamber for causing operation of said supply valve and of said application magnet valve device to lap position.

13. In a brake equipment for vehicles, in combination, a plurality of braking units each comprising a brake cylinder, a straight air pipe for controlling the supply of fluid under pressure to said brake cylinders to effect an application of the brakes, application and release magnet valve devices for controlling the supply of fluid under pressure to and the release of fluid under pressure from said straight air pipe, a brake valve device having a pressure chamber subject to straight air pipe pressure and a chamber containing control mechanism for controlling said application and release magnet valve devices, a shaft extending between said chambers and operatively connected to said control mechanism, supply and release valves for controlling the supply of fluid under pressure to and the release of fluid under pressure from said pressure chamber, and means for actuating said shaft simultaneously with the operation of said supply and release valves to effect the simultaneous supply of fluid under pressure to said straight air pipe through said supply valve and said supply magnet valve devices, and to effect the simultaneous release of fluid under pressure from said straight air pipe through said release valve and said release magnet valve devices, and means operative upon an increase in the fluid pressure in said pressure chamber for causing operation of said supply valve and of said application magnet valve device to lap position.

ELLIS E. HEWITT.
RANKIN J. BUSH.